3,219,462
PROCESS FOR VACUUM DEHYDRO-FREEZING OF FOODSTUFFS

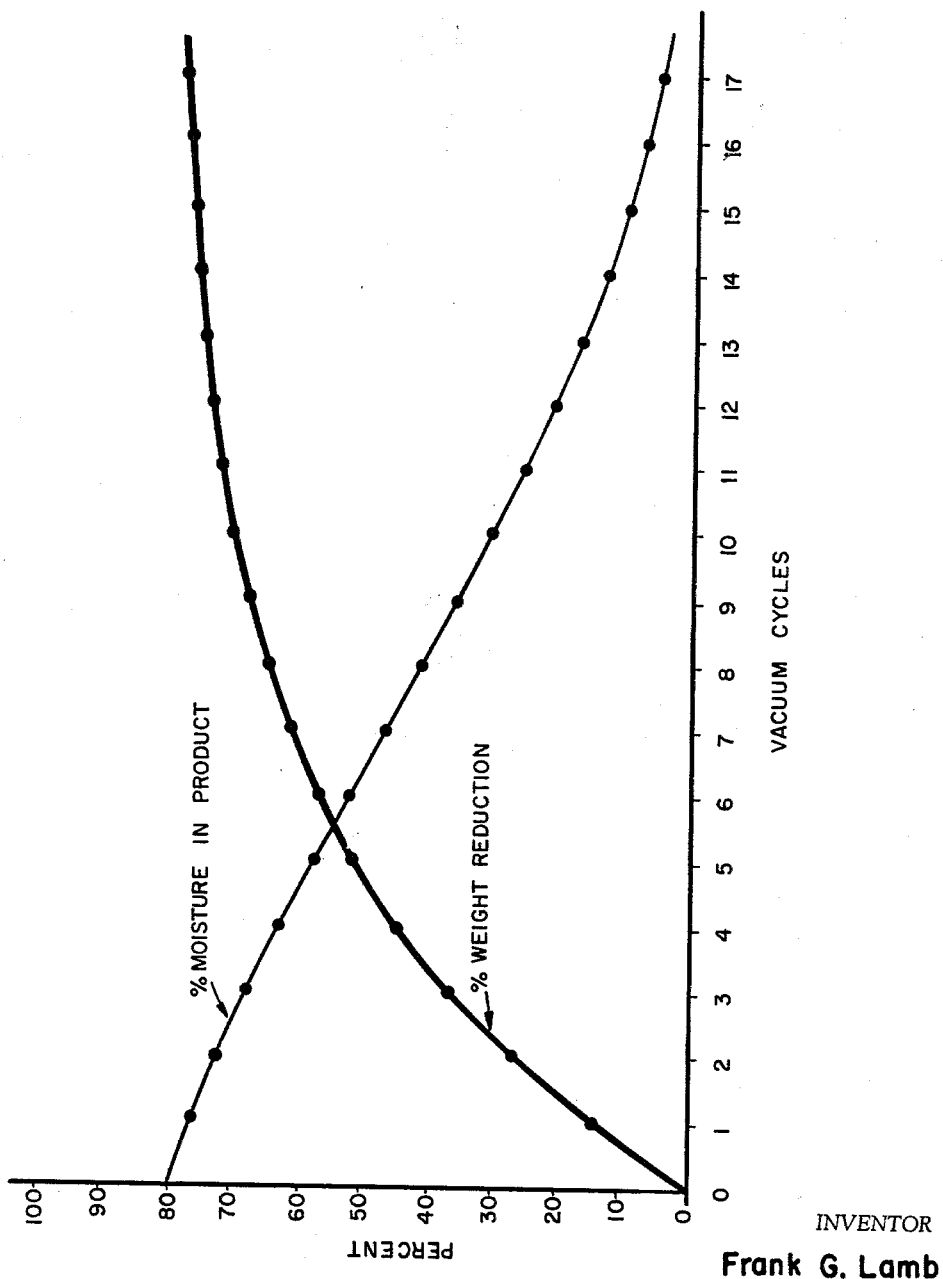

Frank G. Lamb, American Falls, Idaho, assignor to Lamb-Weston, Inc., Weston, Oreg., a corporation of Oregon
Filed Dec. 8, 1961, Ser. No. 157,956
4 Claims. (Cl. 99—204)

This invention relates to a process for the preservation of various types of food products, and is particularly directed to a process involving vacuum dehydration of such products in a sequence of steps that includes freezing of the product as a final stage, either by vacuum or other known freezing methods.

The invention may be summarized as basically involving the following novel concept: that if a given amount of water is evaporated from a given product by vacuum, such vacuum reducing the temperature of said product to the freezing point (32° F. for water, and somewhat less than this for solutions found in most foodstuffs) or slightly above freezing, and then a suitable time period is allowed to lapse with imposition of such predetermined amount of vacuum as to maintain said temperature before freezing by lowering of the temperature to below 32° F., the remaining water in the product, upon freezing, will have space in which to expand without rupturing the cells of the product or without rupture or damage to the pectin lattice work outside the cells which hold the cells in place. Differently stated, the concept of this invention involves imposition of vacuum upon the product so as to obtain some appreciable dehydration of the product, or water removal from this product, at a temperature at or slightly above freezing, prior to actual freezing. This results, as stated, in the provision of the required space for the ice crystals formed when the temperature is lowered to limits substantially below the freezing point. Cell rupture and damage to the pectin lattice work extraneous of the individual cells, is thus precluded.

Much modern research has been directed toward improving the quality of frozen food. The constant aim has been to provide freezing procedures, of whatever type, which will, upon reconstitution of the given product, result in duplicating the taste, appearance and other inherent qualities of the product exhibited by the same when it is fresh. However, frozen foods as of today still exhibit a taste quality that in most instances cannot compare with the taste and other inherent qualities of the product when fresh. This is perhaps particularly true with respect to such foods as meats and sea foods, the latter type of product being extremely resistant to dehydration and freezing procedures which will result, upon reconstitution, in complete reinstatement of the taste quality.

It is my view that cellular damage during dehydration or freezing procedures causes such failure of full reconstitution or is the fundamental cause of failure to regain the full taste and other desirable qualities of the product when fresh.

The instant invention is propounded as eliminating the many disadvantages inherent in partial dehydration and freezing procedures heretofore known, since the process here provided for eliminates, or substantially eliminates, damage to the cellular structures of the product as well as obviates damage to the pectin lattice work of the product, during the freezing period.

Although not all factors entering into the successful results which are accomplished by the instant invention are known, it is my theory, as implied above, that the inherent qualities of food products are destroyed by dehydration and/or freezing procedures which result in cell deterioration.

It is also believed that the reason almost any kind of food product, as vegetables, fruits, meats, etc., have a tendency to "bleed" after thawing is not only because some or a substantial portion of the cells thereof have been damaged by the freezing process, but also because the pectin cross-linkage structure which holds the cells together has also been ruptured. In its normal state, the pectin cross-linkage structure holds water in between the cells, very probably as "bound" water, much as a silicate gel or calcium chloride attracts and holds water without chemical action. Consequently, when such lattice work of pectin is ruptured, the water is not "bound" and therefore bleeds.

It has been found that such cellular damage, and damage to the pectin lattice, can be prevented if during the vacuum freezing of the product the product is maintained at the freeze point or just above the same, without freezing, for an appreciable period of time before imposition of additional vacuum (or other means) to lower the temperature to well below freezing. The effect of this is, inter alia, to permit gradual withdrawal of some of the water deposited exteriorly to the individual cells, with the result that, with further lowering of temperature and freezing of the moisture within the cells, expansion thereof is permitted without cellular damage. Room for expansion of the ice in the pectin lattice work is also provided. The over-all effect is to retain the basic cellular structure of the product, and hence, upon reconstitution, to permit that cellular formation to regain its original form. Taste and quality are thus fully retained.

Although all facets and underlying causes and effects of my procedure are not known, the theory of this invention is thought to follow this pattern: if the product is subjected to rapid imposition of vacuum, say from room temperature through the freezing point to below freezing and in one continuous and rapid stage, the heat of the whole mass, including the heat inside the cell, is being used to evaporate moisture from between and outside the cells. It is considered that the heat will travel from inside a given cell through the cell wall by conduction much more rapidly than moisture will travel through the cell wall by osmotic action or water vapor through the cell wall by vapor pressure. Hence, if the moisture between the cells is removed to a much greater extent than the moisture from inside the cell, the result is to freeze the full moisture inside the cell before it can get out. That cell is consequently expanding by the rapidly lowered temperature at the same time that moisture is being withdrawn from the lattice work between the cells. The lattice work thus becomes weakened and hence more susceptible to rupture.

Consequently, the novel concept of this invention: a delay of the entire dehydro-vacuum freeze process at the freeze point level sufficiently long for the moisture inside the cell and the moisture outside such cell to equalize before freezing. The result is but a very small fraction of damage, if any at all, to cell walls, and as well, preservation of the pectin lattice work which supports the cellular mass.

In the foregoing, when reference is made to pectin lattice work, what is meant is the pectin cross-linkage structure in addition to the related lignin and cellulous molecules. Vegetables are different in their structure in certain respects from, for example, the cellular structure of meats. However, in all instances, and speaking of various types of food products, there is transmission through the cell wall membrane which, if by osmotic action, or other type of penetration, requires some time. The instant procedures provide for that requisite period of time with the end result of attaining a partially dehydrated, frozen food product that can be fully and completely reconstituted, and at least to a far greater degree than foods frozen by procedures heretofore known.

Viewed in the light of the foregoing explanation of the background of this invention, it is to be understood that a primary objective thereof is the provision of a process whereby a food product can be partially dehydrated and frozen, during a two-step operation, in such manner that little or no damage is done to the cellular structure of the said product as a result of the freezing procedure, whereby the product upon reconstitution is rehabilitated to its former state, here having reference to such natural qualities as taste, texture, appearance, etc.

It is a further object of the invention to provide a two-stage vacuum procedure for dehydration and reduction of the temperature of the product to the freeze point thereof or slightly above freezing, following which the product is maintained under an adjusted magnitude of vacuum to maintain such temperature and to remove a significant portion of contained moisture, this period of delay withdrawing sufficient moisture from the product to permit rapid freezing by, e.g., lowering of such vacuum to a greater degree, whereby the ice of crystallization is afforded room for expansion with consequent lack of damage to the cellular structure.

Another objective of the invention is the provision of a multi-step procedure of the type herein referred to by means of which the product can be dehydrated, in a series of cycles, by alternate dehydro-freezing and increasing of temperature followed by subsequent dehydration by any means such as with dry warm air followed by freezing or vacuum dehydration, etc. In other words, the multi-step cycle can be repeated as a continuing sequence until the ultimate amount of dehydration or water removal has been attained. The determination as to how much dehydration is necessary rests, of course, upon the consideration of the type of product being dehydro-frozen. In the instant invention, it is to be observed that the primary purpose thereof is partial dehydration. Such partial dehydration permits of full and complete reconstitution. Depending on the nature of the product dehydration may be in the order of moisture removal of from 3% to 94% of the original moisture content of said product.

It is a further object of the invention to provide a method for dehydro-freezing which takes full account of the novel concept, heretofore unappreciated by the art, that cellular damage to a food product will occur by rapid lowering of temperature, through the freezing point, to extremely low temperatures below freezing, in one continuous stride. In this respect, damage is attributed to this effect of such quick freezing: rapid freezing, even by the vacuum method, causes freezing of the bound moisture of the pectin lattice work at approximately the same time the moisture within the individual cells freezes. The result is that such internal moisture has no room for expansion upon freezing and the cell walls are ruptured or other cellular damage takes place. The two-step procedure of this invention permits room for expansion during freezing; thus the elimination of cellular damage.

Other advantages and objectives of this invention will be apparent from consideration of the following, more detailed disclosure thereof.

It is visualized that if it is desired to dehydrate about 8% or less of water from a given food product, and to accomplish this equally throughout the mass of the product, the preferred method should be by way of vacuum treatment. In the course of such procedure, should for example, the product be subjected to a vacuum of about e.g., 4.6 mm. of mercury, the contained water will boil at 32° F. plus but will not freeze.

However, once the product mass is cooled to the freeze point or slightly above, and in unfrozen condition, and the desired amount of moisture removed through subjection to vacuum of the order indicated, the product is now in an ideal situation for fast freezing by any of several methods. It may be preferred to lower the vacuum to a more extreme level as for example from about one-half mm. to about 2 mm. of mercury. This extremely low vacuum will rapidly freeze and evaporate more of the contained moisture as freezing takes place. This, however, does not eliminate the possibility of freezing, after reaching the 32° F. level by application of low temperature by other media. Air blast freezing may be mentioned as an alternate. In this instance such latter method works faster and better than where it is employed in known processes because the product has here been "precooled" to 32° F. Liquid nitrogen methods of freezing will also function ideally well for low temperature application after this initial vacuum step.

It is of course obvious that certain food products may require blanching or partial cooking. In this event, and following the prescriptions of the instant method, it is possible to heat such products under steam pressure in the same pressure vessel that later becomes the vacuum chamber for application of required low vacuum. Apparatus to perform this dual function is well known to those skilled in the art.

In any event when the procedure contemplates this initial step of blanching or partial cooking, steam is then injected into the chamber so as to exhaust most of the noncondensibles, as air, with the steam. When a blanching or cooking step at elevated temperature is completed, the product temperature will, in most cases, be about 200° F. At such temperature, there is enough residual heat in the product so that for each pound of water 168 B.t.u.'s (200 minus 32) will be available to vaporize the latent moisture. At, for example, 4.6 mm. pressure and 32° temperature, the heat of vaporization is somewhere between 1000 to 1100 B.t.u.'s per pound of water, and thus there is available 168 B.t.u.'s mentioned in the foregoing. Hence, it is theoretically possible to evaporate 168 divided by 1050 or up to 16% of such contained moisture.

It is obvious also that certain food products, such as fruits, do not require blanching and such would be undesirable. Even in this event, however, there is sufficient heat in the pulp of the fruit at room temperature to make possible achievement of the purpose of the invention. Although in the first dehydration phase of the process, moisture removal in the order of 6% to 8% is contemplated as preferable, predehydration of this magnitude may not be necessary with respect to certain types of food products. Thus with regard to fruits, for example, as little as 3% removal of the moisture content may suffice. This is because in this type of product the cell walls and pectin lattice work will withstand some strain without rupture consequent upon expansion of the remaining moisture when transformed into ice.

It is also theoretically possible that a part of the 144 B.t.u.'s per pound of water represented by the heat of fusion is available to boil off moisture before ice is formed. In other words, and viewing this explanation from the theoretical viewpoint, an 80° F. pulp temperature of strawberries will have 48 B.t.u.'s per pound of water (80 minus 32) available at 4.6 mm. vacuum, so that 4.6% (48 divided by 1050) of the water should be boiled off in the fashion indicated. This amount represents sufficient evacuation of moisture, or dehydration, and with respect to this particular product, as to permit the remaining moisture in the product to expand, upon freezing, without rupture or damage to either cell walls or pectin structure.

The two-step procedure which has been referred to in the foregoing is more specifically contemplated in the following description.

The first step is the imposition of vacuum to a point which will lower the temperature of the given product to or just above the freeze point thereof, and with a corresponding amount of dehydration due to vacuum withdrawal. It is contemplated that in this first step the amount of vacuum will be from about 4.6 mm. pressure. It will be appreciated that water is evaporated from the product due to the greater water pressure in the product than in the medium surrounding the product. Further, as such water is evaporated by the lowered pressure, heat is given up by the product and product temperature is reduced to the freezing point.

Intermediate the initial step and the final freezing phase, the product is permitted to rest at the same temperature (i.e., at or slightly above the determined freeze point of the given product) for a period of time sufficient to dehydrate the product, depending upon its type, in an amount of about 3% to about 4% of the total moisture content. The period of time will vary, depending upon the specific type of product being processed; however, it has been found that at the pressures indicated and with respect to most foodstuffs, the "rest" period will average from about 5 minutes to about 10 minutes.

Most fruits, vegetables and foodstuffs including meats, fish and fowl will freeze in a relatively short period of time upon the application of a vacuum of from about 4.5 mm. to about 4.6 mm. of mercury.

In any event, subsequent to this waiting period during which portion of time a substantial amount of dehydration has taken place, i.e., from 3 to 10%, depending upon its nature, the product is subjected to the second step or phase of treatment. Here it is quickly reduced in temperature to a point well below freezing, i.e., from about 0° F. to —10° F. This can be accomplished by the same vacuum concept, and in this instance with the desire for immediate freezing, the vacuum can be lowered to a pressure of from about .5 mm. to 2 mm. Alternatively, in this phase of the second part of each cycle of the treatment, and as mentioned above, other conventional methods of quick freezing may be employed to lower product temperature the amount required for immediate freezing.

As further explanatory of the theory underlying this invention, it is to be appreciated that most if not all foodstuffs are made up of a large percentage of water. In order to cool the given food product to a given temperature, it is thus necessary to lower the gas pressure surrounding the product to a given vacuum level. The water in the foodstuff will then "boil" away until the product temperature is lowered to the corresponding vacuum pressure. At from about 4.5 to about 4.6 mm. of vacuum pressure, the corresponding temperature (for water) will be about 32° F.

At this stated vacuum pressure, based upon the specific heat of the food product subjected to vacuum (and assuming adequate evaporable moisture in the product) a calculatable amount of moisture will be removed, thereby removing heat from the product until the temperature thereof reaches that temperature corresponding to the stated vacuum pressure. Most foodstuffs subjected to such vacuum (e.g., 4.6 mm. of mercury) at room temperature have sufficient specific heat to evaporate enough water to lose from 3 to 7% of their surface weight. This 3 to 7% of weight is lost from the surface in the intercellular space in the product because the moisture requires time to lift from inside the individual cells. The specific heat which is in the individual cell moves from the cell by conduction more rapidly than the water, liquid or vapor can go through the cell wall. It is thus proposed that, by holding the vacuum pressure at, e.g., 4.6 mm. of mercury for 5 to 10 (or more) minutes, the moisture within the individual cell will progress into the intercellular space until it reaches an equilibrium point. After this equilibrium point has been reached, the whole foodstuff is approximately equally dehydrated throughout its mass. The value of this procedure lies in these fundamental considerations:

Firstly, if a given foodstuff is not partially dehydrated before freezing, it is apparent that freezing of the moisture in the product will result in corresponding expansion because ice requires more space than water. This expansion of the ice (in such a procedure) will cause damage by rupture of the cellular structure of the product, due to lack of expansion space. In the instant invention, by evacuating approximately 5 to 10% (or more) of the water prior to freezing, and by accomplishing evaporation uniformly throughout the product, room is provided for expansion due to freezing and without cellular or intercellular damage.

Secondly, if a foodstuff be partially dehydrated, but dehydrated predominantly with respect to the intercellular spaces, as distinguished from dehydration within the cell, a situation may be created whereby freezing may cause more damage than if no dehydration at all had taken place. This is because if the intercellular space is evacuated or moisture evaporated therefrom, and freezing then takes place before the moisture from the cell can migrate to the intercellular space, the freezing of the cell can more easily rupture the cell walls because of the consequent voids between cells. Such explains why the delay of 5 or 10 (or more) minutes before final freezing is an essential and important concept of the instant invention.

With respect to Table I and the graph which accompanies this description, it is seen that the first and second steps of the procedure are contemplated as constituting one complete cycle. In other words, such a cycle can be repeated as many times as necessary to attain the desired degree of dehydration prior to the final freezing step.

Where repeated, and after the second step of the first complete cycle as above described, and also if it be considered that vacuum imposition is the method used for ultimate freezing, the vacuum is released and sufficient heat applied to the product to thaw the same and to raise its temperature to its original value above the freezing point. This is followed by a repetition of the original cycle involving the two steps of: firstly, subjection to vacuum to lower the temperature to the freeze point or just above freezing, a waiting period to permit sufficient dehydration; and secondly, imposition of lowered vacuum (or other freezing procedures) to obtain the ultimate frozen condition.

As indicated elsewhere in this description of the invention, the food product may be treated in accordance therewith whether or not such product is blanched or precooked prior to such treatment. However, generally fruits and certain vegetable products, and such items as fresh strawberries, are subjected to the two-phase procedure of the invention without any such pretreating step.

The tabulation of the runs as set forth in Table I has reference to the processing of fresh peas. Such are subjected to this freeze and dehydration process without blanching. This is reflected in the initial cycle 1 where the percent of moisture removal is about 3.5%, the product having an initial moisture content of about 80%. On the other hand, where blanching is a phase of the over-all procedure, the initial moisture removal as a result of the first cycle, and within the same range of vacuum pressure, will substantially exceed this amount and in many cases will amount to about 10%. Example I, to follow, is representative of this.

After any required number of such two-step cycles, or three-step phases if the waiting period be considered as one of these steps, the product can be removed from the vacuum chamber while frozen and transferred to zero storage. Hence, additional freezing facilities are not required and are not necessary after completion of the dehydro-freezing operation of this invention.

The primary aim of the invention is partial dehydration or dehydration to no greater extent than will prevent full reconstitution of the frozen product. In most cases, the amount of dehydration will not exceed about 20% moisture removal.

However, in the following Table I, the results are indicated where seventeen cycles are used in the processing of a given product (here fresh peas) in accordance with the present invention.

concerned, since when dehydration has gone below a 10% moisture retention, the remaining water at this low content may be considered as "bound water" which does not follow the vapor pressure theories as set forth herein.

TABLE I

| Cycle | Phase | Lbs. water evaporated | Lbs. water remaining | Percent weight reduction (accumulated lbs. water evaporated) | Percent moisture in product | Percent moisture removed |
|---|---|---|---|---|---|---|
| 1 | A | 4.86 | 75.14 | 4.86 | | |
|   | B | 10.30 | 64.84 | 15.16 | 76.5 | 3.5 |
|   | A+B | 15.16 | | | | |
| 2 | A | 4.00 | 60.84 | 19.16 | | |
|   | B | 8.34 | 52.50 | 27.50 | 72.4 | 7.6 |
|   | A+B | 12.34 | | | | |
| 3 | A | 3.29 | 49.21 | 30.79 | | |
|   | B | 6.75 | 42.46 | 37.54 | 68.0 | 12.0 |
|   | A+B | 10.04 | | | | |
| 4 | A | 2.71 | 39.75 | 40.25 | | |
|   | B | 5.45 | 34.30 | 45.70 | 63.2 | 16.8 |
|   | A+B | 8.16 | | | | |
| 5 | A | 2.25 | 32.05 | 47.97 | | |
|   | B | 4.40 | 27.65 | 52.35 | 58.0 | 22.0 |
|   | A+B | 6.65 | | | | |
| 6 | A | 1.87 | 25.78 | 54.22 | | |
|   | B | 3.54 | 22.24 | 57.76 | 52.7 | 27.3 |
|   | A+B | 5.41 | | | | |
| 7 | A | 1.56 | 20.68 | 59.32 | | |
|   | B | 2.84 | 17.84 | 62.16 | 47.2 | 32.8 |
|   | A+B | 4.40 | | | | |
| 8 | A | 1.31 | 16.53 | 63.47 | | |
|   | B | 2.27 | 14.26 | 65.74 | 41.6 | 38. |
|   | A+B | 3.58 | | | | |
| 9 | A | 1.11 | 13.15 | 66.85 | | |
|   | B | 1.80 | 11.35 | 68.65 | 36.2 | 43.8 |
|   | A+B | 2.91 | | | | |
| 10 | A | .94 | 10.41 | 69.59 | | |
|   | B | 1.43 | 8.98 | 71.02 | 31.0 | 49.0 |
|   | A+B | 2.37 | | | | |
| 11 | A | .80 | 8.18 | 71.82 | | |
|   | B | 1.12 | 7.06 | 72.94 | 26.1 | 53.9 |
|   | A+B | 1.92 | | | | |
| 12 | A | .69 | 6.37 | 73.63 | | |
|   | B | .87 | 5.50 | 74.50 | 21.8 | 58.2 |
|   | A+B | 1.56 | | | | |
| 13 | A | .62 | 4.88 | 75.12 | | |
|   | B | .67 | 4.21 | 75.79 | 17.4 | 62.6 |
|   | A+B | 1.29 | | | | |
| 14 | A | .53 | 3.68 | 76.32 | | |
|   | B | .50 | 3.18 | 76.82 | 13.7 | 66.3 |
|   | A+B | 1.03 | | | | |
| 15 | A | .47 | 2.71 | 77.29 | | |
|   | B | .37 | 2.34 | 77.66 | 10.5 | 69.5 |
|   | A+B | .84 | | | | |
| 16 | A | .42 | 9.92 | 78.08 | | |
|   | B | .26 | 1.66 | 78.34 | 7.6 | 72.4 |
|   | A+B | .68 | | | | |
| 17 | A | .39 | 1.27 | 78.73 | | |
|   | B | .17 | 1.10 | 78.90 | 5.2 | 74.8 |
|   | A+B | .56 | | | | |

As indicated by the above table, by the time the cycle has been repeated this number of times, it will be seen that the retained moisture of the product, in the last cycle is 5.2%, whereas the percent of moisture removal, or dehydration, is 74.8%.

Dehydration to an extent greater than the figure just given is not practical, insofar as the present invention be The percentage moisture retention and percentage weight reduction of the product in accordance with the figures set forth in Table I are graphed in the accompanying chart.

Empirical formulae will indicate the number of cycles to be utilized to attain a predetermined amount of dehydration with respect to any given product. The following calculations indicate only the specific heat of the solid or food product and the approximate moisture content thereof need be known. With this information the amount of moisture retention and corresponding moisture removal can readily be determined:

The following calculations are thus based upon these determined factors:

Specific heat of solids (here fresh peas) = 0.25
Specific heat of water = 1.00
Heat of vaporization = 1050 B.t.u./lb.
Heat of fusion = 144 B.t.u./lb.

100 lb. product at 80% moisture (20 lb. solids, 80 lb. water) and at 92° F., the freezing point of the product is 32° F.

Product temperature is lowered 60° F. (by vacuum) to such freezing point.

Phase A

Lbs. water evaporated in cooling product 60° F. (92° to 32° F.) =

$$\frac{(\text{Specfic heat of solids}) \times (\text{°F. change in solids})}{(\text{Heat of vaporization of water})}$$

$$\times (\text{Lb. solids})$$

(This calculation remains constant for each cycle.)

$$\frac{(\text{Specific heat of water}) \times (\text{°F. change in water})}{(\text{Heat of vaporization of water})}$$

×(Lb. water in product. This value changes for each cycle.)

$$\frac{(0.25 \text{ B.T.U./lb.}) \times (60°F.)}{1050 \text{ B.T.U./lb.}} \times (20 \text{ lb.})$$

$$+ \frac{(1.0 \text{ B.T.U./lb.}) \times (60°F.)}{1050 \text{ B.T.U./lb.}} \times (80 \text{ lb.})$$

$$= 0.29 \text{ lb.} + 4.57 \text{ lb.} = 4.86 \text{ lb.}$$

Lbs. water remaining in product = (80.00 − 4.86) = 75.14 lb.

Phase B

Lbs. water evaporated due to heat of fusion released as product is frozen =

$$\frac{(\text{Heat of fusion of water})}{(\text{Heat of vaporization of water})}$$

×(Lb. of water remaining in product. This value changes each cycle.)

$$= \frac{(144 \text{ B.T.U./lb.})}{(1050 \text{ B.T.U./lb.})} \times (75.14 \text{ lb.}) = 10.30 \text{ lb.}$$

Lbs. water remaining in product = (75.14 − 10.30) = 64.84 lb.

The above calculations are typical, and representative of similar calculations for the preparation of Table I. As here set forth one complete cycle is referred to. Thus, Phase A of the cycle represents calculations for weight reduction after initial vacuum application for temperature reduction to 32° F.; the Phase B calculations set forth represent weight reduction consequent upon application of final freeze vacuum. Each time the product is warmed to above the freeze point, subjected to vacuum to precool and then frozen after a waiting period, is herein referred to as a "cycle."

Also, it is to be observed that the amount of moisture removal (e.g., 3.5% in cycle 1) is calculated upon the basis of application of sufficient vacuum to freeze the product; the moisture removal consequent upon subcooling (i.e., to temperatures substantially below the freeze point) has not been calculated as the same is nominal, and not significant, by comparison. For example, if after the product is frozen, sufficient vacuum is applied to the frozen product, the vapor pressure of the ice will be greater than the surrounding medium and the ice will sublime, reducing the amount of ice in the product and also reducing the product temperature. The amount of ice so evaporated is quite small since the specific heat of ice is one-half that of water and the temperature change corresponding to the change in vapor pressure of the ice relatively small.

It is also to be observed that in the specific calculations set forth in the foregoing, the moisture content of the particular product there involved (fresh peas) was 80%. However, food products of different types vary in the amount of included moisture, some approaching a moisture content somewhat in excess of 90%, others having a moisture content of about 70%. In any event, the over-all percentage of moisture removal or percentage of dehydration can be readily calculated by the foregoing irrespective of the initial moisture content of the food product being treated. Such calculations thus afford the operator a guide as to the balance of the involved variables to obtain, for example, the desired amount of moisture removal, the required amount of reduced pressure, the period of time of dehydration, etc. The product, during practice of this process, is also under constant observation by the operator, with readings being taken of internal temperatures, and hence this constitutes a further factor permitting the operator to increase pressure during the "wait period" to preclude freezing. Other involved variables are likewise readily ascertainable, once the over-all procedures and advantages of this invention, as set forth herein, are understood by those skilled in the art.

The following examples of the practice of the invention are illustrative only and not to be considered as confined to the precise food products herein referred to. In other words the processing is applicable without restriction to almost any type of food product, particularly those which have a porous exterior. But some foods, such as grapes and peas, must have their skins punctured for ready access to the interior thereof in order for the vacuum procedure to have its desired effect.

EXAMPLE I

A quantity of fresh peas are slit and placed within a vessel able to withstand internal and external pressures of about 20 p.s.i. The vessel is constructed with a 100-pound capacity.

The vessel is pressure sealed and steam introduced until the peas reach a temperature of between 200 to 212°, and that temperature maintained for a period of about 5 minutes. Such steam treatment blanches the peas and also introduces an amount of heat beneficial in the next step, consisting of vacuum application.

The steam is turned off and a vacuum applied to the interior of the vessel in an amount of about 4.6 mm. mercury pressure. The charge is submitted to such vacuum for a period of about 8 minutes, the temperature being reduced during this period of time to about 33° F.

The vessel is kept at this pressure and the charge maintained at the stated temperature for a period of about 10 minutes, suitable variation by way of increase in pressure being made by the operator to maintain the temperature at a point no lower than 32° F. At the end of this time, the peas are dehydrated or moisture removed therefrom, in an amount of about 10%. The purpose of the instant step in the procedure is not only to obtain sufficient dehydration but, as a result of such dehydration, to thereby provide sufficient space for the expansion of the residual water when it is frozen by the final quick freeze phase.

Pressure is then increased to normal and hot air, at a temperature of about 150° F., passed through the product. When the product reaches 35° F., the hot air is removed and vacuum applied. Here the vacuum is of sufficient amount to rapidly and completely freeze the product and to reduce the temperature thereof to about 0° F. Such vacuum is in the order of 2 mm. of mercury and the required time to reach this lowered, and freezing temperature, about 5 minutes.

EXAMPLE II

Twenty-five pounds of potatoes are peeled, washed, diced into quarter-inch cubes, and precooked in a conventional manner.

This product, at a temperature of about 200° F., is then placed in a vacuum chamber and pressure applied in the order of about 4.6 mm., of mercury. At this vacuum, the product is reduced, in about 5 minutes, to a temperature of 33° F. This pressure is maintained for a period of about 10 minutes. The amount of moisture reduction, during this waiting period while under vacuum, is about 15% of the original total moisture content.

After such waiting period at this vacuum, and maintaining in this manner the temperature of the charge at the stated amount, the vacuum is adjusted to about .5 mm. of mercury, the result being to rapidly lower the temperature of the product to 5° F. in a period of about 5 minutes. This results in the additional removal to the extent of about 12% of the original moisture content of the product.

This cycle is then repeated, i.e., temperature of the product raised by the admission of air at a 150° temperature until the produce reached 35° F.; vacuum applied in the order of 4.5 mm. of mercury, and temperature reduced to about 32° F. over a period of about 8 minutes. The product is permitted to stand under this pressure during a period of about 5 minutes at which time the contained moisture is determined to be 20%.

The vacuum is then lowered to .5 mm. mercury and the product thereby frozen.

The frozen potatoes are then removed and placed in deep freeze storage.

EXAMPLE III

Fifteen pounds of cleaned, stemmed and fresh strawberries are placed in a vacuum chamber. Starting with the first phase of the first cycle, the strawberries are subjected to a vacuum pressure of 4.6 mm. mercury. This reduces the temperature of the strawberries to 33° F. in about 5 minutes. The charge is permitted to stand in this reduced pressure zone for a period of an additional 8 minutes, temperature being controlled and regulated by necessary increase in pressure for this period of time.

After such period, during which a substantial portion of the moisture is removed from the product due to the imposition of vacuum, the pressure is lowered to about 2 mm. mercury. This will, in about 8 minutes, lower the temperature of the product to about 0° F., at which point it is solidly frozen.

It will be determined that after the first step of the two-phase cycle and prior to final freezing at a lower vacuum, the strawberries will exhibit a moisture reduction of about 3.5%.

The charge is then placed in permanent deep freeze storage.

Almost any type of food product can be satisfactorily treated by means of the instant method. In accordance with the formulae set forth above, the amount of vacuum to be initially applied may vary somewhat with respect to different products; the time limit as to period of initial subjection to vacuum may vary also within a range of several minutes. At any rate, these variables, in most instances, will fall within the following preferred ranges. When the phrase in this description "at the freeze point" is used, what is meant is that the temperature is preferably as low as possible without substantial freezing or formation of ice within the product. The process is operable during this dehydration "rest" period if the temperature is slightly above freezing. Hence, if 32° F. represents the freeze point, the preferred range as to this holding period would be from about 32° F. to about 36° F. Where the freeze point varies from product to product, the range would be, in such instance, from freeze point to 4° above freeze point.

The normal period of time for most products to be dehydrated to a sufficient degree prior to freezing in each cycle of the process should not exceed 10 minutes and normally this period of time will be from about 5 to 10 minutes.

Similarly, the final freeze stage under vacuum conditions of the order given will also occupy a time period of from about 5 to about 10 minutes. If conventional freezing apparatus is to be utilized after the dehydration phase (rather than the vacuum freeze procedure), then of course this period may also substantially vary.

In any event, with an understanding of the basic principles involved in the instant invention, and having particular reference to Table I hereof as well as the specific examples set forth herein, those skilled in the art can readily determine the optimum conditions or variables and the optimum or preferred ranges of same that will lead to the desired functions and results of this invention.

The main and novel concept thereof revolves about complete appreciation of the cellular damage that can be done, during a freezing procedure, to any type of food product if the conditions are not so controlled and regulated as to prevent rupture of the cellular structure of the product. By practice of this invention, damage thereto is substantially, if not completely precluded, for it is here recognized that expansion of the ice crystals will cause such damage unless controlled, and provision is consequently made for space for expansion of such ice crystals during the final freezing step, or, if a plurality of cycles are employed, during the application of low freeze temperatures of each cycle.

Although this description has been largely confined to a freezing technique involving only partially dehydrated foods, i.e., foods dehydrated no more than 20% less than their original moisture content, the same principles of operation are applicable to dehydration of greater extent. In the latter event, full reconstitution may not be desired. At any rate, if a given product is dehydrated to the extent as represented by the final product of cycle 17 of Table I, then the product approaches nearly complete dehydration, for here it is seen that only 5.2% of moisture is retained in the product. In any event the procedure is still advantageous. When such a product, so dehydrated, is placed in a boiling solution for at least partial reconstitution, retention of the cellular framework or structure of such product results in an appreciable enhanced flavor or taste over similar products which have been dried to this substantial extent but not through use of the instant procedure.

Insofar as the partial dehydration of frozen foods to which this invention is primarily directed be concerned, the result thereof is to attain full and substantially complete reconstitution. This means reproduction of the taste, appearance and texture qualities which parallel and are equivalent to the same qualities as found in the original fresh food. This beneficial result can again be attributed to the over-all achievement of the invention: preservation of the natural cellular or structural framework of the product during its subjection to the dehydration and freezing techniques herein set forth. This is accomplished, in summary, by delaying the dehydro-freeze process at or near the freeze point level of the particular product under consideration for a sufficient period of time to permit the moisture inside the individual cells and outside such cells to equalize before the freezing phase. In other words, vaporization of the included moisture of the product, or the desired amount of dehydration of the product, is here accomplished where the product is "resting" in a close to freezing but unfrozen state. After moisture removal, and since the product is just at or slightly above the freeze point, freezing can then be accomplished quickly, efficiently, and with the expenditure of a minimum amount of additional energy.

It is obvious that other expedients and alternates may be utilized without departing from the scope of this invention. For instance, and as I have indicated supra, it may be desired to utilize other means of dehydration to dehydrate the product after or before the application of vacuum for either dehydration or freezing. As an example it may be desirable to submit the product to a five-minute vacuum until the product has lost 15% water, then subject the product to conventional, dry air dehydration until 30% more water is lost, and then finally to further dehydrate and freeze the product by application of a vacuum for a period of say, about two minutes.

In any event the invention is to be considered inclusive of such alternate procedures, and not to be limited in scope in any way except as same is limited by the scope of the appended claims.

I claim:

1. A process for the dehydration and freezing of a fruit, vegetable and meat food product, said dehydration being in an amount of from about 3% to about 94% of the original moisture content of said product, said process comprising the steps of: subjecting said product to a reduced pressure of no lower than about 4.6 mm. of mercury in a vacuum zone to bring said product to the freeze point without freezing said product, said product being subjected to said reduced pressure for a period of time of at least from about five to about ten minutes to remove from about 3% to about 10% of the moisture in said product and to maintain said product at just above the freeze point thereof during said period of time by imposition of said amount of vacuum, freezing said product, reheating said product to above said freeze point, and repeating said moisture removal and freezing steps a sufficient number of times to remove a predetermined amount of moisture from said product within the aforesaid amount of from about 3% to 94%, the final step of said process being a final freezing of said product.

2. A process for the dehydration and freezing of a fruit, vegetable and meat food product, said dehydration being in an amount of from about 3% to about 94% of the original moisture content of said product, said process comprising the steps of: subjecting said product to reduced pressure in a vacuum zone, said pressure being of the order of about 4.6 mm. of mercury, said product being subjected to said reduced pressure for a period of time of at least from about five to about ten minutes to remove from about 3% to about 10% of the moisture in said product, maintaining said product at just above the freeze point thereof during said period of time by maintaining said reduced pressure at about 4.6 mm. of mercury, freezing said product, reheating said product to above said freeze point, and repeating said moisture removal and freezing steps a sufficient number of times to remove a predetermined amount of moisture from said product within said amount of from about 3% to about 94%, the final step of said process being a final freezing of said product.

3. A process for the dehydration and freezing of a fruit, vegetable and meat food product, said dehydration being in an amount of from about 3% to about 94% of the original moisture content of said product, said process comprising the steps of: subjecting said product to reduced pressure in a vacuum zone, said pressure being of the order of about 4.6 mm. of mercury, said product being subjected to said amount of reduced pressure for from about five minutes to about ten minutes whereby from about 3% to about 10% of the moisture is removed from said product while said product is maintained at just above the freeze point thereof whereby ice expansion space is provided in said product when said product is frozen, freezing said product by reducing said pressure from about .5 mm. to about 2 mm. of mercury for a period of from about five to about ten minutes, reheating said product to above said freeze point, and repeating said moisture removal and freezing steps a sufficient number of times to remove a predetermined amount of moisture from said product, the final step of said process being a final freezing of said product.

4. A process for the dehydro-freezing of a fruit, vegetable and meat food product comprising: placing said product in a vacuum zone, reducing the pressure in said zone to about 4.6 mm. of mercury to precool said product to a temperature of from about 32° F. to about 36° F. while under said amount of reduced pressure, maintaining said temperature and said pressure in said zone for a period of time of from about 5 minutes to about 10 minutes to dehydrate said product to the extent of from about 3% to about 10% moisture removal without freezing said product, lowering the temperature of said product to below said freeze point by reducing said pressure to from about one-half mm. of mercury to about 2 mm. of mercury, whereby said product becomes frozen, reheating said product to a temperature slightly above freezing, repeating said dehydrating step to further dehydrate said product by application of vacuum for the said period of time, and again reducing said pressure to from about one-half mm. of mercury to about 2 mm. of mercury, whereby said product is again frozen, said product not being subjected to cellular damage during each of said freezing steps.

References Cited by the Examiner

UNITED STATES PATENTS 2,930,139   3/1960   Brynko _____ 99—204 X

OTHER REFERENCES

"Food Industries": January 1945, pp. 92–95, article entitled "Drying by Sublimation," 168, 170, 172, 174, 176 and 178.

A. LOUIS MONACELL, *Primary Examiner.*

TOBIAS E. LEVOW, *Examiner.*